United States Patent Office 3,525,030
Patented Aug. 18, 1970

3,525,030
CONTROL CIRCUIT FOR STATIC CONVERTERS
Royston Alfred Hammond and George Tilstone, Stafford, England, assignor to The English Electric Company Limited, London, England, a British company
Filed Mar. 29, 1968, Ser. No. 717,210
Claims priority, application Great Britain, Mar. 31, 1967, 14,976/67
Int. Cl. H02m 7/00; H02n 7/14
U.S. Cl. 321—5   10 Claims

ABSTRACT OF THE DISCLOSURE

This invention relates to a control circuit for a static converter which is operable to detect the occurrence of "zero current" in the controlled devices of the converter. The control circuit comprises diode bridge networks for separately monitoring the voltage appearing across a controlled device in each phase arm of the converter and a network of logical elements operable to develop an output to withdraw the firing pulses from all the devices in that converter in response to the detection by the bridge networks of a voltage appearing across all the monitored devices simultaneously.

---

This invention relates to a control circuit for a static converter, and more particularly relates to a circuit for detecting pre-determined electrical conditions occurring in controlled devices during the operation of such a converter and influencing the conduction of these devices in response thereto.

According to one aspect of the invention, there is provided a control circuit for a multi-phase static converter, comprising sensing means for separately monitoring the voltage appearing across a controlled device in each phase arm of the converter and circuit means for withdrawing firing pulses from all the devices in that converter in response to the detection by the sensing means of a voltage appearing across all the monitored devices simultaneously and exceeding a predetermined level.

The sensing means may comprise diode bridge networks each connected to an A.C. source, the networks being operative to act as switches in dependence on the presence or absence of the monitored voltages appearing across the associated devices such that the A.C. supply is rectified and fed as a control potential to the circuit means in response to the presence of these voltages. Alternatively, the sensing means may include an electro-optical arrangement. In turn, the circuit means may comprise a network of logical elements operative normally to provide an output only in response to the control potentials being applied thereto from all the monitored sources but in which this output may be inhibited during normal periods of commutation between the controlled devices in the converter. This "inhibiting" circuit may conveniently comprise a gate for selecting pulses at the instant of commutation to trigger-on a monostable multivibrator, the output from the logical network being inhibited during the relaxation period of this multivibrator.

By positively detecting the occurrence of a voltage across the controlled devices in all the phase arms in this way, it is thereby ensured that there is no current flowing through them and the firing pulses may be safely withdrawn whereas, without such detection, a "follow through" fault condition could arise if the firing pulses were withdrawn whilst the converter was inverting since natural commutation amongst the devices is then inhibited.

The invention is of particular utility in systems involving the use of cross-connected, anti-parallel converter bridges connected, for example, to drive a motor in either forward or reverse directions since by removing the firing pulses from the appropriate one of the converters there is no circulating ripple current flowing between the two converter bridges and accordingly the need to provide a series reactor for limiting the magnitude of this circulating current is avoided.

In order that the invention may be fully understood, one embodiment thereof will now be described with reference to the accompanying drawings, in which.

Figure 1:
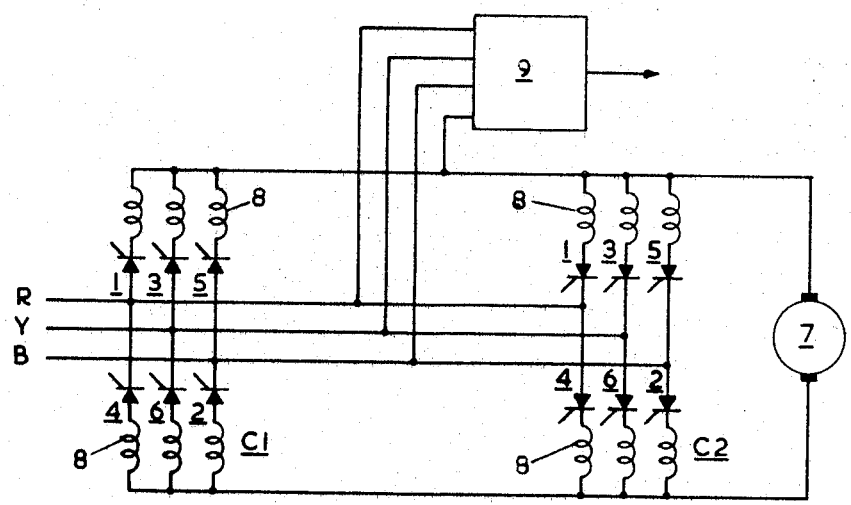
FIG. 1 illustrates an arrangement of cross-connected, anti-parallel converter bridges connected to drive a D.C. motor.

Referring now to FIG. 1, there are shown two cross-connected converter bridges C1 and C2 each having six controlled devices, e.g. thyristors 1 to 6, arranged to drive a D.C. motor 7 in a forward or reverse direction, respectively, from a three phase A.C. supply R, Y, B. A current-limiting reactor 8 is connected in series with each thyristor and a "zero current" detector 9 is connected between the three phase lines and one common D.C. line of the converters. As mentioned above, the purpose of this detector is to detect the periods for which there is no current flowing through one of the converter bridges from which it is required to withdraw firing pulses, since these pulses must only be withdrawn under conditions of zero current as otherwise if they are withdrawn whilst inverting natural commutation amongst the thyristors is inhibited and a "follow thorugh" fault condition may result.

Figure 3:
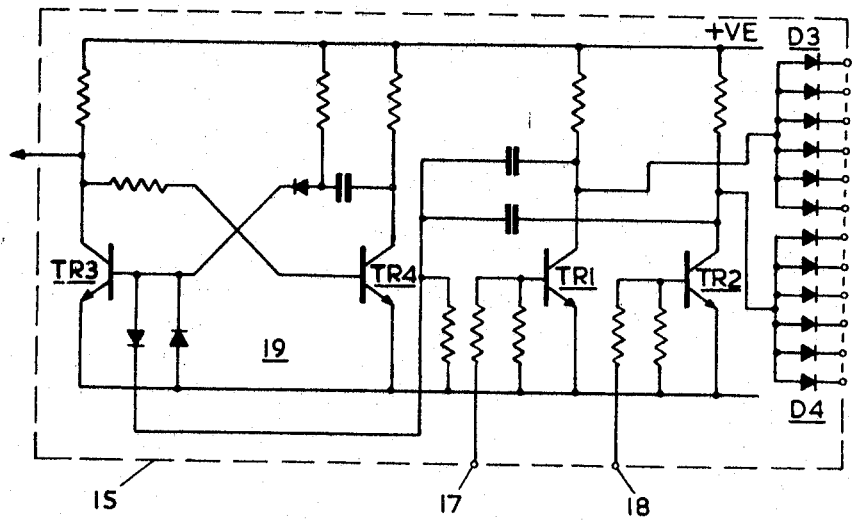
FIGS. 2 and 3 illustrate circuit details of a "zero current" detector associated with the arrangement shown in FIG. 1, and FIG. 4 schematically illustrates a modification of the FIG. 2 circuit in which the monitored voltage information from the converter is optically transmitted.
Figure 2:
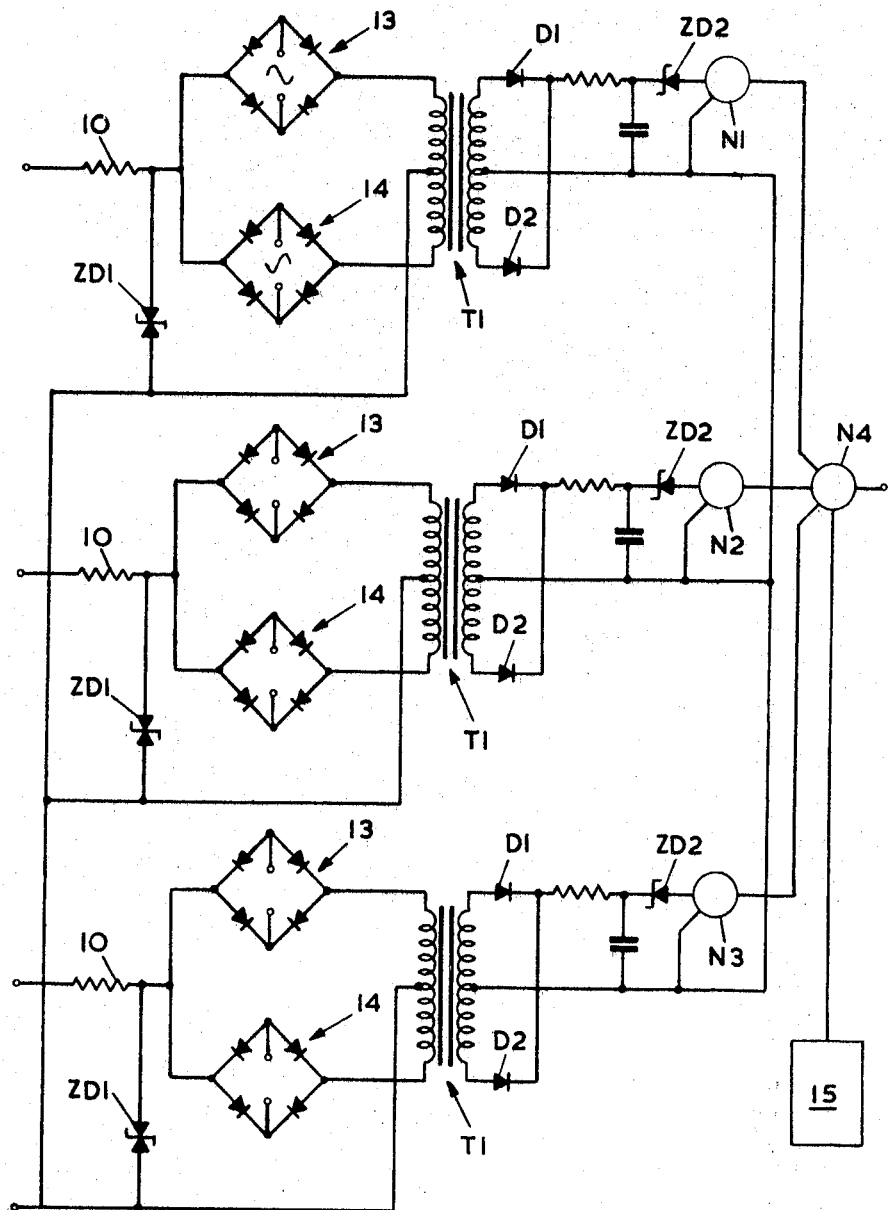

This zero current detector is shown in more detail in FIGS. 2 and 3 to which reference will now be made.

The three inputs to the detector, one for each phase arm, each comprise a series volage dropping resistor 10 and a symmetrical Zener diode ZD1, and the direct voltage developed across this diode is applied through two bridge networks 13, 14 to the primary winding of a centre-tapped isolating transformer T1. Anti-phase alternating voltages are applied to the A.C. terminals of the two networks 13, 14 to "open" the bridge on alternate half cycles so that, in the presence of a D.C. input, current will flow through the upper and lower halves of the primary winding during successive half cycles.

Any output developed on the secondary winding of transformer T1 is rectified by diodes D1, D2 and applied through a smoothing RC circuit to a Zener diode ZD2, the purpose of this diode being to ensure that the output must exceed a certain threshold level to actuate the succeeding NOR logical circuit N1, N2 or N3, thereby preventing these logical circuits from being switched by any ripple voltages developed across the transformer by the action of the bridge circuits.

The outputs from all three NOR circuits N1, N2, N3 are applied to a further NOR circuit N4 together with the output from a control circuit 15, this circuit being operative to inhibit an output from this NOR circuit for periods during which the thyristors in the converter C1, C2 are commutating between one another so as to prevent malfunction of the system during these periods due to the development of spurious voltage pulses.

In particular, this control circuit (FIG. 3) comprises a set of diodes D3 for receiving pulses corresponding to those for firing the thyristors in converter C1 and a set of diodes D4 for receiving pulses corresponding to those for firing the thyristors in converter C2. The common anode connections of the diodes D3 are connected to the collector of a common emitter transistor TR1, and similarly, the common anode connections of the diodes D4 are connected to the collector of a transistor TR2, transistor TR1 being inhibited from operation during the period for which converter C1 is non-conducting by a signal applied to its base from terminal 17, and transistor TR2 being inhibited from operation during the period for which converter C2 is non-conducting by a signal applied to terminal 18.

During normal operation, only one of the converters is conducting at any time so that an output will be developed from either TR1 or TR2 and this is applied to a monostable multi-vibrator 19 comprising two transistors TR3, TR4. Thus, each time a negative pulse occurs from TR1 or TR2, transistor TR3 is inhibited from conduction so that a positive pulse is impressed on the appropriate input to NOR circuit N4 thus preventing an output being produced therefrom for the period of this pulse, that is, the relaxation period of the multi-vibrator which is designed to embrace the aforesaid commutation period.

In describing the operation of the detector, it will be assumed initially that converter C1 is operative to drive the motor 7 in a forward direction and that it is required to withdraw firing pulses from the thyristors in this converter. This withdrawal must only be effected from the thyristors at an instant when they are non-conducting so that the development of a significant voltage across them, i.e. across the appropriate Zener diode ZD1, will indicate this condition. Each phase arm of the converter is monitored in this way and thus the maximum delay in withdrawing the pulses is restricted to one third of a cycle.

The occurrence of a voltage across all the zener diodes ZD1 biasses-off the diodes in the bridge networks 13, 14 so that the alternating voltage applied to the networks appears across the primary winding of each transformer T1; the rectified voltage on the secondary side exceeds the threshold level of the Zener diodes ZD2 and accordingly the resulting signal on the corresponding inputs to the NOR circuits N1–N3 changes from "0" to "1" so that the outputs all change from "1" to "0."

With converter C1 in operation, it will be recalled that there is an inhibit signal on terminal 18 to bias-off transistor TR2 so that only the "firing" pulses applied through diode set D3, i.e. those associated with converter C1, are operative on the monostable multivibrator 19. The incidence of one of these pulses causes TR3 to be biassed-off for only a short period, e.g. 2 msecs., so that the corresponding input to the NOR circuit N4 is only at "1" for this short period. At other times transistor TR3 will be conducting and a "0" will be impressed on the input to this NOR circuit and thus, with all the other inputs to the NOR circuit at "0" at the instant of zero current an output will be developed therefrom for withdrawing pulses at that instant from all the thyristors in the converter C1, and since none of these is conducting there is now no possibility of a "follow through" fault condition.

Figure 4:
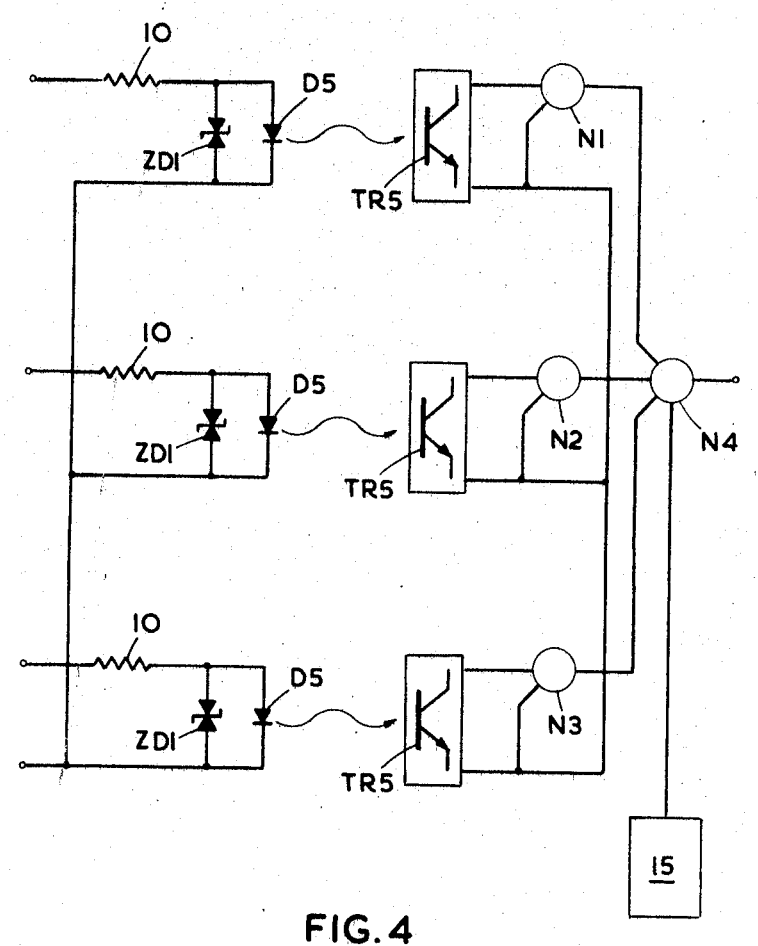

It is to be understood that many modifications may be made to the specific embodiment described without departing from the scope of this invention. For example, insulation levels between the converter itself and the logic circuitry may necessitate their isolation from one another, and in this event the monitored voltage information from the three phase arms of the converter bridges is locally transmitted to this circuitry. For this purpose a light emitter and detector may be employed instead of the bridge networks 13, 14 and the transformer T1, e.g. as shown in FIG. 4 in which a p-n gallium arsenide light emitter D5 is connected across the Zener diode ZD1 associated with each phase arm and an amplifier including a silicon photo-transistor TR5 is connected in the input to the appropriate NOR circuits N1–N3. The light may be transmitted through an air path or alternatively perspex guides or even fibre optic light guides may be employed depending on the insulation levels required. A photo diode or a light-activated thyristor may be used instead of the photo-transistor.

We claim:
1. A control circuit for a multi-phase static converter having at least one controlled device in each phase arm, comprising
   sensing means for separately monitoring the voltage appearing across a said controlled device in each phase arm of the converter and developing a control signal therefrom, and
   circuit means including logic gates responsive to the control signals for withdrawing firing pulses from all the devices in that converter in response to the detection by the sensing means of a voltage appearing across all the monitored devices simultaneously and exceeding a predetermined level.

2. A control circuit according to claim 1, wherein the circuit means comprise
   a number of first NOR gates for receiving a respective one of said control signals and
   a second NOR gate connected to all the first gates and operable to develop an output for withdrawing said firing pulses only in response to all inputs from the first gates being of like sign.

3. A control circuit for a multi-phase static convertor having at least one controlled device in each phase arm, comprising
   sensing means for separately monitoring the voltage appearing across a said controlled device in each phase arm of the convertor and developing a control signal therefrom; and
   circuit means responsive to the control signals for withdrawing firing pulses from all the devices in that convertor in responsive to the detection by the sensing means of a voltage appearing across all the monitored devices simultaneously, and exceeding a predetermined level, said circuit means comprising
   a number of first NOR gates for receiving a respective one of said control signals, and
   a second NOR gate connected to all the first NOR gates and operable to develop an output for withdrawing said firing pulses only in response to all inputs from the first gates being of like sign.

4. A control circuit according to claim 3, comprising an inhibit circuit for inhibiting the output from the second gate durng normal periods of commutation between the controlled devices in the converter.

5. A control circuit according to claim 4, wherein the inhibit circuit comprises
   a monostable multivibrator and
   a gating network for selecting pulses at the instant of commutation to trigger-on the multivibrator, the output from the said second gate being inhibited during the relaxation period of this multivibrator.

6. A control circuit according to claim 3, comprising an A.C. source, and wherein the sensing means comprise diode bridge networks each connected to said D.C. source, the networks being operative as switches actuated in dependence on the presence or absence of the monitored voltages appearing across the associated devices such that the A.C. supply is rectified and fed as the control signal to the said circuit means in response to the presence of said voltage.

7. A control circuit according to claim 3, wherein the sensing means comprise
   a light emitter activated by the monitored voltage across the associated devices and a
   light activated sensor responsive to the emitted light and operable to develop therefrom the control signal for the circuit means.

8. A control circuit for a three phase static converter including two three-phase bridge networks of thyristors connected in anti-parallel and having a common supply, comprising three sensing means separately connected across each phase of the common supply for monitoring the voltage appearing across a said thyristor in each arm of the bridge, and circuit means including logic gates for withdrawing firing pulses from all the thyristors in the two bridge networks in response to the detection by said sensing means of a voltage simultaneously appearing across the thyristors in all the bridge arms and exceeding a predetermined level.

9. A control circuit for a three phase static convertor including two three-phase bridge networks of thyristors connected in anti-parallel and having a common supply, comprising three sensing means separately connected across each phase of the common supply for monitoring the voltage appearing across a said thyristor in each arm of the bridge, said meaning means each comprising a diode bridge network connected across an auxiliary A.C. source, and circuit means for withdrawing firing pulses from all the thyristors in the two bridge networks in response to the detection by said sensing means of a voltage simultaneously appearing across the thyristors in all the bridge arms and exceeding a predetermined level, the diode networks being operative as switches actuated in dependence on the presence of absence of the monitored voltages appearing across the associated thyristors such that the A.C. source is rectified and fed as a control signal to the said circuit means in response to the presence of said voltage.

10. A control circuit according to claim 9, wherein the sensing means each comprise a light emitter activated by the monitored voltage across the associated thyristors and a light-activated sensor responsive to the emitted light and operable to develop therefrom a control signal for the circuit means.

References Cited

UNITED STATES PATENTS

| | | | |
|---|---|---|---|
| 3,315,143 | 4/1967 | Lawrence et al. | 321—13 X |
| 3,399,337 | 8/1968 | Stone | 321—5 |

J D MILLER, Primary Examiner

W. H. BEHA, Jr., Assistant Examiner

U.S. Cl. X.R.

321—11, 13, 27